United States Patent
Jin et al.

(10) Patent No.: US 10,623,516 B2
(45) Date of Patent: Apr. 14, 2020

(54) DATA CLOUD STORAGE SYSTEM, CLIENT TERMINAL, STORAGE SERVER AND APPLICATION METHOD

(71) Applicant: Hangzhou Hikvision Digital Technology Co., Ltd., Hangzhou, Zhejiang (CN)

(72) Inventors: Shengpeng Jin, Zhejiang (CN); Qiqian Lin, Zhejiang (CN); Weichun Wang, Zhejiang (CN); Yinmei Xiong, Zhejiang (CN)

(73) Assignee: Hangzhou Hikvision Digital Technology Co., Ltd., Hangzhou, Zhejiang (CN)

( * ) Notice: Subject to any disclaimer, the term of this patent is extended or adjusted under 35 U.S.C. 154(b) by 137 days.

(21) Appl. No.: 15/781,312

(22) PCT Filed: Aug. 23, 2016

(86) PCT No.: PCT/CN2016/096344
§ 371 (c)(1),
(2) Date: Jun. 4, 2018

(87) PCT Pub. No.: WO2017/092414
PCT Pub. Date: Jun. 8, 2017

(65) Prior Publication Data
US 2018/0359331 A1    Dec. 13, 2018

(30) Foreign Application Priority Data
Dec. 3, 2015  (CN) .......................... 2015 1 0883969

(51) Int. Cl.
*H04L 29/08*   (2006.01)
*H04L 29/14*   (2006.01)
(Continued)

(52) U.S. Cl.
CPC .......... *H04L 67/2842* (2013.01); *G06F 3/067* (2013.01); *G06F 3/0619* (2013.01);
(Continued)

(58) Field of Classification Search
CPC ...................... H04L 67/1097; H04L 67/2842
See application file for complete search history.

(56) References Cited

U.S. PATENT DOCUMENTS

| 8,645,522 B2 * | 2/2014 | Ohara | H04N 1/00209 |
| | | | 709/224 |
| 9,606,914 B2 * | 3/2017 | Thatcher | G06F 3/0604 |

(Continued)

FOREIGN PATENT DOCUMENTS

| CN | 102130959 A | 7/2011 |
| CN | 102646072 A | 8/2012 |

(Continued)

*Primary Examiner* — Shean Tokuta
(74) *Attorney, Agent, or Firm* — Bret E. Field; Bozicevic, Field & Francis LLP

(57) ABSTRACT

A data cloud storage system, client terminal, storage server and application method, wherein the data storage method includes: sending a storage server query request to a scheduling management service center; receiving and caching first address information when the scheduling management service center is under normal operation, and selecting first address information from the cached first address information; sending a resource request to a storage server corresponding to the first address information; such that the storage server allocates a storage unit for the target data and generates storage resource information; sending a data storage request to the storage server, such that the storage server generates data index information based on attribute information of the target data, and storing the target data in the storage unit allocated to the target data. The embodiments of the present application can guarantee data storage, query and downloading in the event of a failure of the scheduling (Continued)

management service center. Thus, the sensitivity of the data cloud storage system to the failure of the scheduling management service center is reduced.

19 Claims, 11 Drawing Sheets

(51) Int. Cl.
    *G06F 3/06*         (2006.01)
    *H04L 29/06*       (2006.01)
    *G06F 9/50*        (2006.01)

(52) U.S. Cl.
    CPC .......... *G06F 3/0656* (2013.01); *G06F 9/5027* (2013.01); *H04L 65/604* (2013.01); *H04L 65/607* (2013.01); *H04L 67/1097* (2013.01); *H04L 67/32* (2013.01); *H04L 69/40* (2013.01)

(56) References Cited

U.S. PATENT DOCUMENTS

| | | | |
|---|---|---|---|
| 9,729,625 | B1 * | 8/2017 | Davidson ............ H04L 63/0428 |
| 2002/0128995 | A1 * | 9/2002 | Muntz ..................... G06F 16/10 |
| 2011/0064076 | A1 * | 3/2011 | Matsuo ............. H04L 29/12066 |
| | | | 370/389 |
| 2013/0159525 | A1 * | 6/2013 | Koike ..................... H04L 67/32 |
| | | | 709/225 |
| 2014/0222873 | A1 * | 8/2014 | Nakadai .............. G06F 16/2282 |
| | | | 707/803 |
| 2014/0250232 | A1 * | 9/2014 | Liu ..................... H04L 41/0896 |
| | | | 709/226 |
| 2015/0106468 | A1 * | 4/2015 | Kobayashi .......... G06F 12/0813 |
| | | | 709/212 |
| 2018/0007429 | A1 * | 1/2018 | Wang ..................... H04N 5/225 |

FOREIGN PATENT DOCUMENTS

| | | |
|---|---|---|
| CN | 102932266 A | 2/2013 |
| CN | 103678523 A | 3/2014 |
| CN | 103731507 A | 4/2014 |
| CN | 104967691 A | 10/2015 |
| WO | WO-2013139153 A1 * | 9/2013 |
| WO | WO2013159703 A1 | 10/2013 |
| WO | WO-2017140130 A1 * | 8/2017 ............. H04L 29/08 |

* cited by examiner

DATA CLOUD STORAGE SYSTEM, CLIENT TERMINAL, STORAGE SERVER AND APPLICATION METHOD

The present application claims the priority to a Chinese patent application No. 201510883969.2 filed with the State Intellectual Property Office of People's Republic of China on Dec. 3, 2015 and entitled "Data cloud storage system, client terminal, storage server and application method", which is incorporated herein by reference in its entirety.

TECHNICAL FIELD

The present application relates to the technical field of Internet, and in particular to a data cloud storage system, a client terminal, a storage server and an application method.

BACKGROUND

With the Internet technology improving constantly, cloud storage technologies show prominent advantages in data storage, users can store data in cloud storage systems. For example, in the field of video surveillance, a large number of video data are often stored in data cloud storage systems implemented by cloud storage technologies. Currently, most data cloud storage systems are distributed systems adopting a client-server model. A master node (i.e. a scheduling management service center) can manage various slave nodes (i.e. storage servers) in the system. When the master node fails, the entire data cloud storage system will not function properly. Obviously, such data cloud storage systems are very sensitive to the running state of the master node.

In order to solve the problem that the entire data cloud storage system cannot run normally due to the failure of a master node, a hot standby method is provided in the prior art. There are two master nodes (a master node A and a master node A') running at the same time in the system. If the master node A which is currently running fails, it immediately switches to the standby master node A', thus ensuring that the entire data cloud storage system can continue under normal operation.

It can be seen that the above method can guarantee, to a certain extent, the normally operation of the data cloud storage system. However, this method merely replaces the master node A by the master node A' when the master node A fails, to ensure the normal operation of that system. In the case that the master node A has not yet returned to a normal running state, and the standby master node fails too, the data cloud storage system will not function properly as well. Obviously, such data cloud storage systems are also very sensitive to the running state of the master node or the standby master node.

SUMMARY

The present application provides a data cloud storage system, a client terminal, a storage server and an application method to ensure that the data cloud storage system can continue storing, querying and downloading data in the event that the master node in the system fails, which reduces the sensitivity of the data cloud storage system to the failure of the scheduling management service center.

To achieve the above objectives, embodiments of the present application disclose a data storage method, which is applied in a client terminal in a data cloud storage system including a scheduling management service center, a plurality of storage servers and a plurality of client terminals, wherein the client terminals are communicatively connected with the scheduling management service center, the client terminals are communicatively connected with the plurality of storage servers, and the scheduling management service center is communicatively connected with the plurality of storage servers, the method including:

sending a storage server query request containing an identifier of target data to the scheduling management service center;

when the scheduling management service center is under normal operation, receiving first address information of a storage server for storing the target data sent by the scheduling management service center, and caching the identifier of the target data and the corresponding first address information; when the scheduling management service center is under abnormal operation, selecting the first address information of the storage server for storing the target data from the cached first address information;

sending a resource request to the storage server corresponding to the first address information, such that the storage server generates data index information and storage resource information for the target data based on the resource request and feeds a resource request response back to the client terminal, wherein the storage resource information contains the identifier of the target data and second address information of a storage unit for storing the target data;

upon receipt of the resource request response fed back by the storage server, sending a data storage request containing the target data to be stored to the storage server corresponding to the first address information, such that the storage server stores the target data in the storage unit corresponding to the second address information based on the storage resource information of the target data.

Optionally, when receiving failure information of the scheduling management service center sent by the scheduling management service center after sending the storage server query request containing the identifier of the target data to the scheduling management service center, or when detecting an abnormality in the network connection with the scheduling management service center, determining that the scheduling management service center is under abnormal operation.

To achieve the above objectives, embodiments of the present application disclose a data access method, which is applied in a client terminal in a data cloud storage system including a scheduling management service center, a plurality of storage servers and a plurality of client terminals, wherein the client terminals are communicatively connected with the scheduling management service center, the client terminals are communicatively connected with the plurality of storage servers, and the scheduling management service center is communicatively connected with the plurality of storage servers, the method including:

sending a storage server query request containing an identifier of target data to the scheduling management service center;

when the scheduling management service center is under normal operation, receiving first address information of a storage server for storing the target data sent by the scheduling management service center, and caching the identifier of the target data and the corresponding first address information; when the scheduling management service center is under abnormal operation, searching for the cached first address information corresponding to the target data based on the identifier of the target data;

sending a data query request containing the identifier of the target data to the storage server corresponding to the first address information, such that the storage server searches for storage resource information generated during the storage of the target data based on the identifier of the target data, wherein the storage resource information contains the identifier of the target data and second address information of a storage unit for storing the target data, and returning the second address information to the client terminal.

Optionally, the data access method further includes:

sending a data download request, containing the identifier of the target data and the second address information, to the storage server corresponding to the first address information, such that the storage server searches for data index information generated during the storage of the target data based on the identifier of the target data;

obtaining the target data from the storage unit storing the target data based on the found data index information and the second address information, and returning the target data to the client terminal.

To achieve the above objectives, embodiments of the present application disclose a data storage method, which is applied in a storage server in a data cloud storage system including a scheduling management service center, a plurality of storage servers and a plurality of client terminals, wherein the storage servers are communicatively connected with the scheduling management service center, the storage servers are communicatively connected with the client terminals, and the client terminals are communicatively connected with the scheduling management service center, the method including:

receiving a resource request containing an identifier of target data, sent by a client terminal;

allocating a storage unit for the target data and generating storage resource information for the target data based on the resource request, wherein the storage resource information contains the identifier of the target data and second address information of the storage unit for storing the target data;

feeding a resource request response back to the client terminal, such that upon receipt of the resource request response, the client terminal sends a data storage request containing the target data to be stored to the storage server corresponding to first address information;

generating data index information for the target data based on attribute information of the target data;

storing the target data in the storage unit corresponding to the second address information based on the storage resource information of the target data.

Optionally, the target data include video stream data or video file data.

Optionally, when the target data are video stream data of a surveillance system, the identifier of the target data is the unique ID of a video encoder that encodes the video stream data;

the generated storage resource information for the target data at least includes the correspondence between the unique ID of the video encoder and the storage unit for storing the video stream data in the storage server corresponding to the first address information;

the generated data index information for the target data at least includes the correspondence between the unique ID of the video encoder and the point in time of a key video frame in the video stream data;

storing the target data in the storage unit allocated for the target data based on the storage resource information of the target data, includes: obtaining the unique ID of the video encoder corresponding to the video stream data contained in the resource request sent by the client terminal; determining the storage unit for storing the video stream data based on the correspondence between the unique ID of the video encoder and the storage unit in the storage server corresponding to the first address information; storing the target data in the determined storage unit in the storage server.

Optionally, the method includes: sending the storage resource information to the scheduling management service center, such that the scheduling management service center determines the usage status of each of the storage servers based on hardware resource information and the storage resource information reported by each of the storage servers, and if the target data in the received storage server query request have not been stored, allocates a storage server for storing the target data based on the usage status of each of the storage servers and stores the identifier of the target data and node information of the storage server where the target data are located.

To achieve the above objectives, embodiments of the present application disclose a data access method, which is applied in a storage server in a data cloud storage system including a scheduling management service center, a plurality of storage servers and a plurality of client terminals, wherein the storage servers are communicatively connected with the scheduling management service center, the storage servers are communicatively connected with the client terminals, and the client terminals are communicatively connected with the scheduling management service center, the method including:

receiving a data query request containing an identifier of target data, sent by a client terminal;

searching for storage resource information of the target data based on the identifier of the target data, wherein the storage resource information contains the identifier of the target data and second address information of a storage unit for storing the target data;

determining the storage unit storing the target data based on the found storage resource information;

returning the second address information of the storage unit storing the target data to the client terminal.

Optionally, the target data includes video stream data or video file data.

Optionally, when the target data are video stream data of a surveillance system, the identifier of the target data is the unique ID (identifier) of a video encoder that encodes the video stream data;

the found storage resource information at least includes the correspondence between the unique ID of the video encoder and the storage unit for storing the video stream data in the storage server corresponding to first address information;

determining the storage unit for storing the target data based on the found storage resource information, includes: obtaining the unique ID of the video encoder corresponding to the video stream data contained in the data query request sent by the client terminal; determining a storage unit for storing the video stream data based on the correspondence between the unique ID of the video encoder and the storage unit in the storage server corresponding to the first address information.

Optionally, the data access method further includes:

receiving a data download request containing the identifier of the target data and the second address information obtained by query, sent by the client terminal;

searching for data index information of the target data based on the identifier of the target data; obtaining the target data from the storage unit storing the target data based on the found data index information and the second address information; and returning the target data to the client terminal.

Optionally, when the target data are video stream data of a surveillance system, the identifier of the target data is the unique ID of a video encoder that encodes the video stream data;

the found storage resource information at least includes the correspondence between the unique ID of the video encoder and the storage unit for storing the video stream data in the storage server corresponding to the first address information;

the found data index information at least includes the correspondence between the unique ID of the video encoder and the point in time of a key video frame in the video stream data;

obtaining the target data from the storage unit storing the target data based on the found data index information and the second address information, and returning the target data to the client terminal, includes: obtaining the unique ID of the video encoder corresponding to the video stream data contained in the data download request sent by the client terminal; determining a storage unit for storing the video stream data based on the correspondence between the unique ID of the video encoder and the storage unit in the storage server corresponding to the first address information; obtaining the time offset of the target data in the determined storage unit based on the correspondence between the unique ID of the video encoder and the point in time of the key video frame in the video stream data, obtaining the target data to be downloaded based on the time offset, and returning the target data to the client terminal.

To achieve the above objectives, embodiments of the present application disclose a client terminal, which is applied in a data cloud storage system including a scheduling management service center, a plurality of storage servers and a plurality of client terminals, wherein the client terminals are communicatively connected with the scheduling management service center, the client terminals are communicatively connected with the plurality of storage servers, and the scheduling management service center is communicatively connected with the plurality of storage servers, the client terminal including:

communication interfaces, which are configured for network communication with the scheduling management service center and each of the storage servers;

a processor, which is configured for sending a storage server query request containing an identifier of target data to the scheduling management service center; when the scheduling management service center is under normal operation, receiving first address information of a storage server for storing the target data sent by the scheduling management service center, and caching the identifier of the target data and the corresponding first address information; when the scheduling management service center is under abnormal operation, selecting the first address information of the storage server for storing the target data from the cached first address information; sending a resource request to the storage server corresponding to the first address information, such that the storage server generates data index information and storage resource information for the target data based on the resource request and feeds a resource request response back to the client terminal, wherein the storage resource information contains the identifier of the target data and second address information of a storage unit for storing the target data; and upon receipt of the resource request response fed back by the storage server, sending a data storage request containing the target data to be stored to the storage server corresponding to the first address information, such that the storage server stores the target data in the storage unit corresponding to the second address information based on the storage resource information of the target data.

To achieve the above objectives, embodiments of the present application disclose a client terminal, which is applied in a data cloud storage system including a scheduling management service center, a plurality of storage servers and a plurality of client terminals, wherein the client terminals are communicatively connected with the scheduling management service center, the client terminals are communicatively connected with the plurality of storage servers, and the scheduling management service center is communicatively connected with the plurality of storage servers, the client terminal including:

communication interfaces, which are configured for network communication with the scheduling management service center and each of the storage servers;

a processor, which is configured for sending a storage server query request containing an identifier of target data to the scheduling management service center; when the scheduling management service center is under normal operation, receiving first address information of a storage server for storing the target data sent by the scheduling management service center, and caching the identifier of the target data and the corresponding first address information; when the scheduling management service center is under abnormal operation, searching for the cached first address information corresponding to the target data based on the identifier of the target data; sending a data query request containing the identifier of the target data to the storage server corresponding to the first address information, such that the storage server searches for storage resource information generated during the storage of the target data based on the identifier of the target data, wherein the storage resource information contains the identifier of the target data and second address information of a storage unit for storing the target data, and returning the second address information to the client terminal.

Optionally, the processor sends a data download request, containing the identifier of the target data and the second address information, to the storage server corresponding to the first address information, such that the storage server searches for data index information generated during the storage of the target data based on the identifier of the target data, obtains the target data from the storage unit storing the target data based on the found data index information and the second address information, and returns the target data to the client terminal.

To achieve the above objectives, embodiments of the present application disclose a storage server, which is applied in a data cloud storage system including a scheduling management service center, a plurality of storage servers and a plurality of client terminals, wherein the storage servers are communicatively connected with the scheduling management service center, the storage servers are communicatively connected with the client terminals, and the client terminals are communicatively connected with the scheduling management service center, the storage server including:

a memory including a plurality of storage units for storing data;

communication interfaces, which are configured for network communication with each of the client terminals;

a processor, which is configured for receiving a resource request containing an identifier of target data, sent by a client terminal, allocating a storage unit for the target data and generating storage resource information for the target data based on the resource request, wherein the storage resource information contains the identifier of the target data and second address information of the storage unit for storing the target data; feeding a resource request response back to the client terminal, such that the client terminal sends a data storage request containing the target data to be stored to the storage server corresponding to the first address information; generating data index information for the target data based on attribute information of the target data; and storing the target data in the storage unit corresponding to the second address information based on the storage resource information of the target data.

To achieve the above objectives, embodiments of the present application disclose a storage server, which is applied in a data cloud storage system including a scheduling management service center, a plurality of storage servers and a plurality of client terminals, wherein the storage servers are communicatively connected with the scheduling management service center, the storage servers are communicatively connected with the client terminals, and the client terminals are communicatively connected with the scheduling management service center, the storage server including:

a memory including a plurality of storage units for storing data;

communication interfaces, which are configured for network communication with each of the client terminals;

a processor, which is configured for receiving a data query request containing an identifier of target data sent by a client terminal; searching for storage resource information of the target data based on the identifier of the target data, wherein the storage resource information contains the identifier of the target data and second address information of a storage unit for storing the target data; determining the storage unit storing the target data based on the found storage resource information; and returning the second address information of the storage unit storing the target data to the client terminal.

Optionally, the communication interfaces are in network communication with the scheduling management service center to report hardware resource information and storage resource information generated by the processor to the scheduling management service center.

Optionally, the processor receives a data download request containing the identifier of the target data and the second address information obtained by query, sent by the client terminal; searches for data index information of the target data based on the identifier of the target data, obtains the target data from the storage unit storing the target data based on the found data index information and the second address information, and returns the target data to the client terminal.

To achieve the above objectives, embodiments of the present application disclose a data storage method, which is applied in a data cloud storage system including a scheduling management service center, a plurality of storage servers and a plurality of client terminals, wherein the client terminals are communicatively connected with the scheduling management service center, the client terminals are communicatively connected with the plurality of storage servers, and the scheduling management service center is communicatively connected with the plurality of storage servers, the method including:

a client terminal sending a storage server query request containing an identifier of target data to the scheduling management service center;

when the scheduling management service center is under normal operation, the client terminal, receiving first address information of a storage server for storing the target data sent by the scheduling management service center, and caching the identifier of the target data and the corresponding first address information; when the scheduling management service center is under abnormal operation, the client terminal selecting the first address information of the storage server for storing the target data from the cached first address information;

the client terminal sending a resource request to the storage server corresponding to the first address information;

the storage server generating data index information and storage resource information for the target data based on the resource request, wherein the storage resource information contains the identifier of the target data and second address information of a storage unit for storing the target data;

the storage server feeding a resource request response back to the client terminal;

upon receipt of the resource request response fed back by the storage server, the client terminal sending a data storage request containing the target data to be stored to the storage server corresponding to the first address information;

the storage server storing the target data in the storage unit corresponding to the second address information based on the storage resource information of the target data.

Optionally, the scheduling management service center determines the usage status of each of the storage servers based on hardware resource information and the storage resource information reported by each of the storage servers, and if the target data in the received storage server query request have not been stored, allocates a storage server for storing the target data based on the usage status of each of the storage servers, and stores the identifier of the target data and node information of the storage server where the target data are located.

To achieve the above objectives, embodiments of the present application disclose a data access method, which is applied in a data cloud storage system including a scheduling management service center, a plurality of storage servers and a plurality of client terminals, wherein the client terminals are communicatively connected with the scheduling management service center, the client terminals are communicatively connected with the plurality of storage servers, and the scheduling management service center is communicatively connected with the plurality of storage servers, the method including:

a client terminal sending a storage server query request containing an identifier of target data to the scheduling management service center;

when the scheduling management service center is under normal operation, the client terminal, receiving first address information of a storage server for storing the target data sent by the scheduling management service center, and caching the identifier of the target data and the corresponding first address information; when the scheduling management service center is under abnormal operation, the client terminal searching for the cached first address information corresponding to the target data based on the identifier of the target data;

the client terminal sending a data query request containing the identifier of the target data to the storage server corresponding to the first address information;

the storage server searching for storage resource information generated during the storage of the target data based on the identifier of the target data, wherein the storage resource information contains the identifier of the target data and second address information of a storage unit for storing the target data;

the storage server returning the second address information to the client terminal.

Optionally, the client terminal sends a data download request containing the identifier of the target data and the second address information obtained by query, to the storage server;

the storage server searches for data index information of the target data based on the identifier of the target data, obtains the target data from the storage unit storing the target data based on the found data index information and the second address information, and returns the target data to the client terminal.

To achieve the above objectives, embodiments of the present application disclose a storage medium, which is configured to store an executable code, the executable code being executed to perform the data storage method or data access method described above.

To achieve the above objectives, embodiments of the present application disclose an application program, wherein the application program performs, when being executed, the data storage method or data access method described above.

As can be seen from the technical solution described above, the embodiments of the present application provide a data cloud storage system, a client terminal, a storage server and an application method, wherein a storage server query request can be sent by the client terminal to a scheduling management service center; when the scheduling management service center is under normal operation, the client terminal receives and caches first address information, and when the scheduling management service center is under abnormal operation, the client terminal can select first address information from the cached first address information; and the client terminal sends a resource request to a storage server corresponding to the first address information; the storage server allocates a storage unit for the target data and generates storage resource information for the target data; the client terminal can sends a data storage request to the storage server; the storage server generates data index information based on attribute information of the target data after receiving the data storage request sent by the client terminal, and stores the target data in the storage unit allocated to the target data. The embodiments of the present application can ensure data storage, data query and data download in the event of a failure of the scheduling management service center. Thus, the sensitivity of the data cloud storage system to the failure of the scheduling management service center is reduced.

BRIEF DESCRIPTION OF THE DRAWINGS

In order to explain the technical solution of embodiments of the present application and of the prior art more clearly, a simple introduction of the drawings required in the description of the embodiments and of the prior art will be given below. Obviously, the drawings described below are merely drawings of some embodiments of the present application. Other drawings can be obtained by those of ordinary skills in the art without any creative effort based on these drawings.

DETAILED DESCRIPTION

To make the objective, technical solution and advantages of the present application more clear, the present application is further described in detail by illustrating embodiments with reference to the drawings. Obviously, the embodiments described herein are only some instead of all embodiments of the present application. All other embodiments obtained by those of ordinary skills in the art based on the embodiments herein without any creative efforts are within the protection scope of the disclosure.

Figure 1:
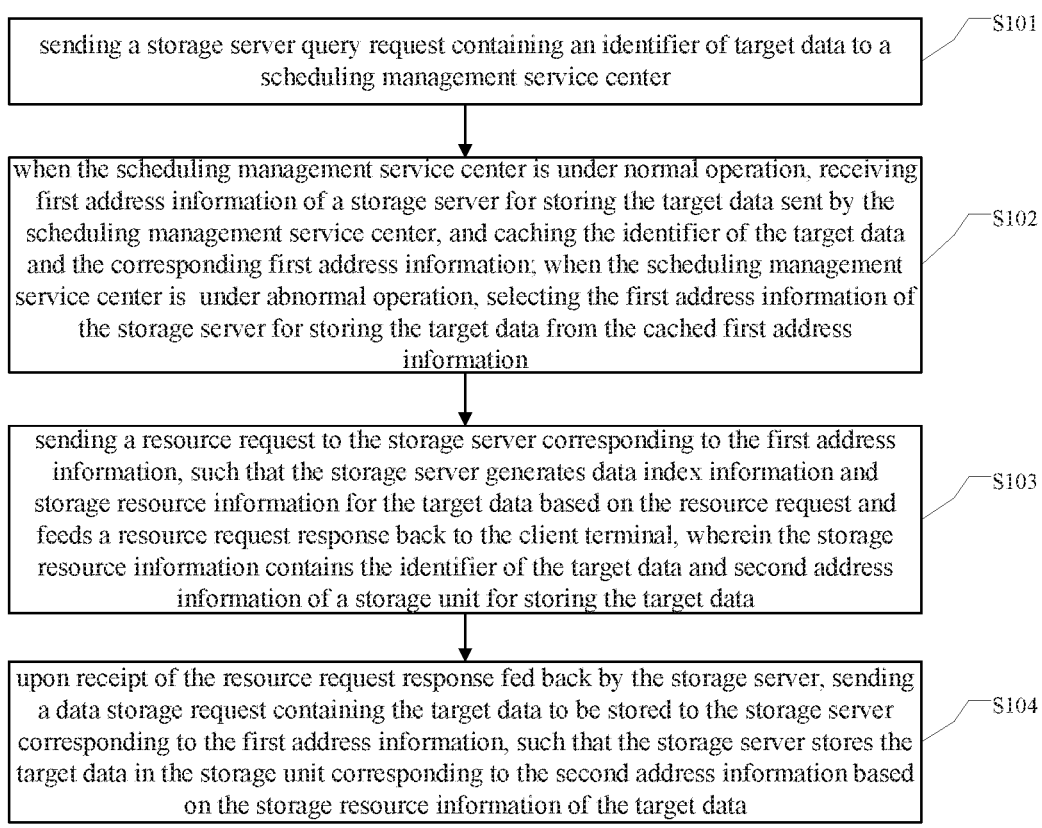
FIG. 1 is a schematic flowchart of a data storage method applied in a client terminal in a data cloud storage system, which is provided by embodiments of the present application.

FIG. 1 is a schematic flowchart of a data storage method applied in a client terminal in a data cloud storage system, which is provided by embodiments of the present application. The data cloud storage system includes a scheduling management service center, a plurality of storage servers and a plurality of client terminals, wherein the client terminals are communicatively connected with the scheduling management service center, the client terminals are communicatively connected with the plurality of storage servers, and the scheduling management service center is communicatively connected with the plurality of storage servers.

Specifically, the data storage method can include the following steps.

S101: sending a storage server query request containing an identifier of target data to the scheduling management service center.

The "scheduling management service center" mentioned herein can be one scheduling management server or can be a cluster composed of a plurality of scheduling management servers, and so on. There are no needs to limit specific ways of setting up the scheduling management service center in the present application, and those of ordinary skills in the art need to make reasonable settings according to particular situations.

It is to be noted that the storage server query request containing the identifier of the target data sent by the client terminal is configured for obtaining first address information of the storage server that are allocated for storage, access (query or downloading) of the target data. first address information can be the IP address or domain name of the storage server, and so on. There are no needs to limit specific information of the first address information in the embodiments of the present application, and any possible implementation can be applied to the present application. Those of ordinary skills in the art need to make settings according to actual situations.

In a particular implementation of the present application, the scheduling management service center can determine the usage status of each of the storage servers based on hardware resource information (e.g., CPU usage, memory size of the storage server, etc.) and storage resource information reported by each of the storage servers.

Specifically, the scheduling management server can determine whether the hardware of each of the storage servers can store more data based on the CUP usage and memory size of the storage server reported by the storage server, and then determine the usage status of each of the storage servers based on the storage resource information of each of the storage servers capable of storing more data.

In a particular embodiment of the present application, if the target data in the received storage server query request have not been stored, a storage server for storing the target data is allocated based on the usage status of each of the storage servers, and the identifier of the target data and node information of the storage server where the target data are located are stored.

S102: when the scheduling management service center is under normal operation, receiving first address information of a storage server for storing the target data sent by the scheduling management service center, and caching the identifier of the target data and the corresponding first address information; when the scheduling management service center is under abnormal operation, selecting the first address information of the storage server for storing the target data from the cached first address information.

In a particular embodiment of the present application, when receiving failure information of the scheduling management service center sent by the scheduling management service center after sending the storage server query request containing the identifier of the target data to the scheduling management service center, or when detecting an abnormality in the network connection with the scheduling management service center, determining that the scheduling management service center is under abnormal operation.

It should be noted that the scenarios where the scheduling management service center is under abnormal operation can include the following two cases: the first case, network connection between the scheduling management service center and the client terminal is normal, but the scheduling management service center itself fails, then it is determined that the scheduling management service center is under abnormal operation; the second case, the network connection between the scheduling management service center and the client terminal is abnormal, in this case regardless of whether the scheduling management service center itself fails or not, it is determined that the scheduling management service center is under abnormal operation. There are no needs to limit the specific situations where the scheduling management service center is under abnormal operation in the embodiments of the present application.

S103: sending a resource request to the storage server corresponding to the first address information, such that the storage server generates data index information and storage resource information for the target data based on the resource request and feeds a resource request response back to the client terminal, wherein the storage resource information contains the identifier of the target data and second address information of a storage unit for storing the target data.

The "storage resource information" mentioned herein refers to the correspondence between the identifier of the target data and the storage unit for storing the target data in the storage server corresponding to the first address information. In the process of querying and downloading target data, the storage server can determine the storage unit for storing the target data based on the storage resource information.

S104: upon receipt of the resource request response fed back by the storage server, sending a data storage request containing the target data to be stored to the storage server corresponding to the first address information, such that the storage server stores the target data in the storage unit corresponding to the second address information based on the storage resource information of the target data.

It can be seen that the embodiments of the present application can guarantee data storage, data query and data download in the event of a failure of the scheduling management service center. Thus, the sensitivity of the data cloud storage system to the failure of the scheduling management service center is reduced.

Figure 2:
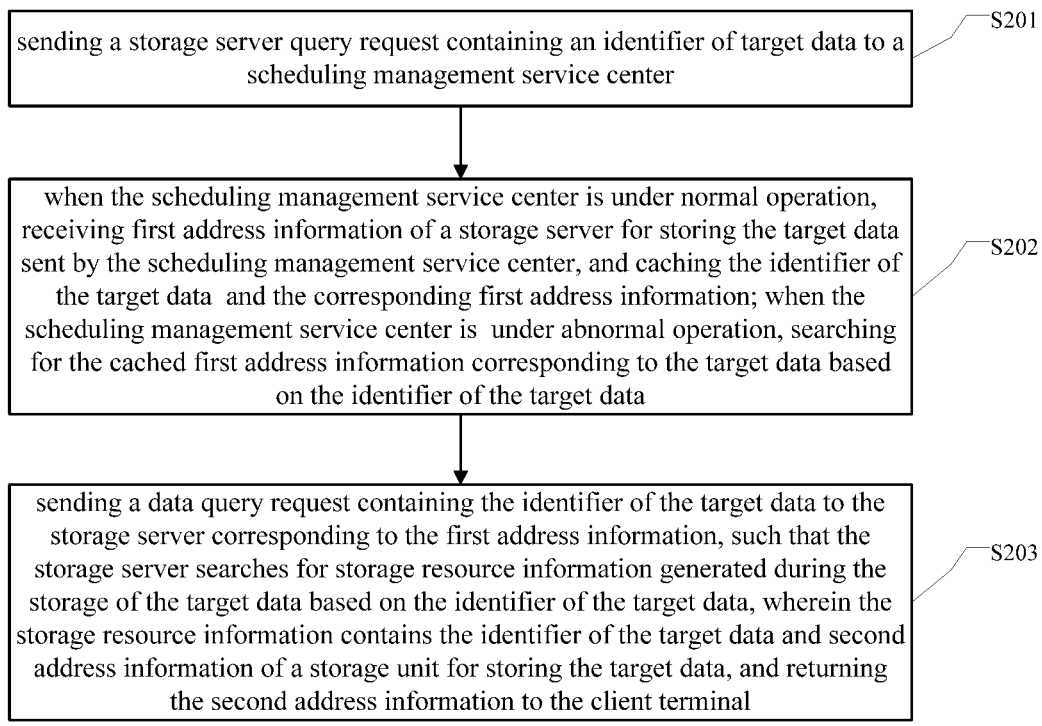
FIG. 2 is a schematic flowchart of a data access method applied in a client terminal in a data cloud storage system, which is provided by embodiments of the present application.

FIG. 2 is a schematic flowchart of a data access method applied in a client terminal in a data cloud storage system, which is provided by embodiments of the present application. The data cloud storage system includes a scheduling management service center, a plurality of storage servers and a plurality of client terminals, wherein the client terminals are communicatively connected with the scheduling management service center, the client terminals are communicatively connected with the plurality of storage servers, and the scheduling management service center is communicatively connected with the plurality of storage servers.

Specifically, the data access method can include the following steps.

S201: sending a storage server query request containing an identifier of target data to the scheduling management service center.

S202: when the scheduling management service center is under normal operation, receiving first address information of a storage server for storing the target data sent by the scheduling management service center, and caching the identifier of the target data and the corresponding first address information; when the scheduling management service center is under abnormal operation, searching for the cached first address information corresponding to the target data based on the identifier of the target data.

S203: sending a data query request containing the identifier of the target data to the storage server corresponding to the first address information, such that the storage server searches for storage resource information generated during the storage of the target data based on the identifier of the target data, wherein the storage resource information contains the identifier of the target data and second address information of a storage unit for storing the target data, and returning the second address information to the client terminal.

It can be seen that the embodiments of the present application can guarantee data storage, data query and data download in the event of a failure of the scheduling management service center. Thus, the sensitivity of the data cloud storage system to the failure of the scheduling management service center is reduced.

Figure 3:
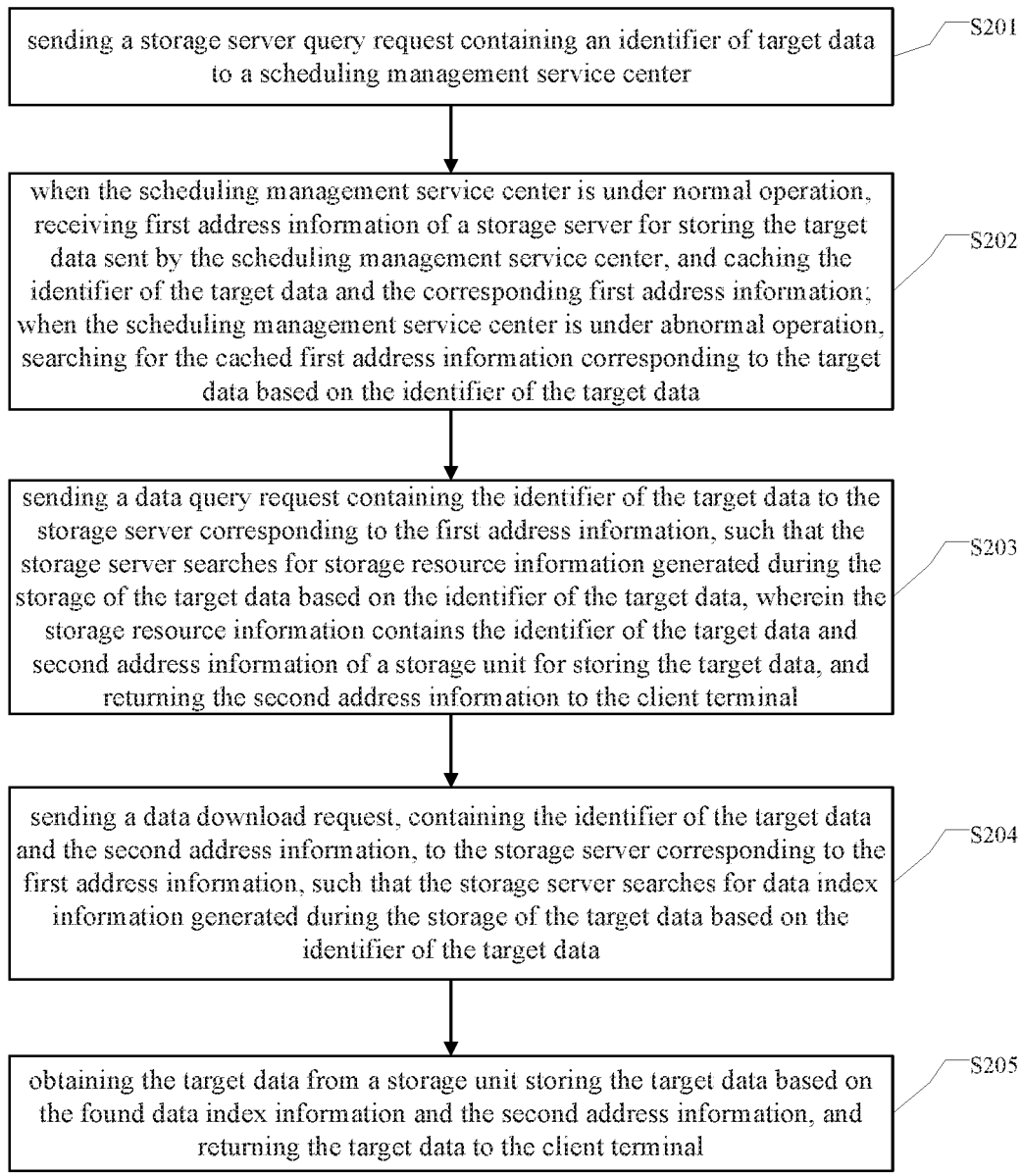
FIG. 3 is a schematic flowchart of another data access method applied in a client terminal in a data cloud storage system, which is provided by embodiments of the present application.

FIG. 3 is a schematic flowchart of another data access method applied in a client terminal in a data cloud storage system, which is provided by embodiments of the present application. On the basis of the embodiment of the method shown in FIG. 2, the following steps can be further included:

S204: sending a data download request, containing the identifier of the target data and the second address information, to the storage server corresponding to the first address information, such that the storage server searches for data index information generated during the storage of the target data based on the identifier of the target data.

S205: obtaining the target data from a storage unit storing the target data based on the found data index information and the second address information, and returning the target data to the client terminal.

It can be seen that the embodiments of the present application can guarantee data storage, data query and data download in the event of a failure of the scheduling management service center. Thus, the sensitivity of the data cloud storage system to the failure of the scheduling management service center is reduced.

Figure 4:
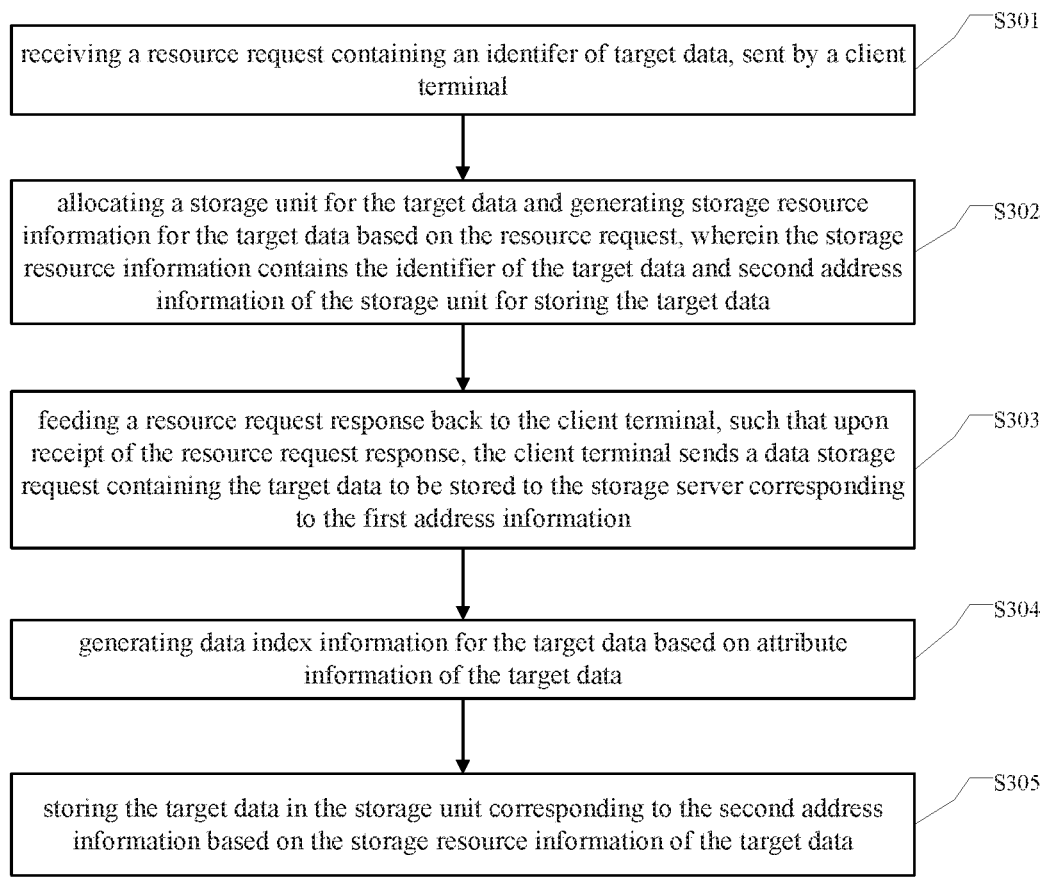
FIG. 4 is a schematic flowchart of a data storage method applied in a storage server in a data cloud storage system, which is provided by embodiments of the present application.

FIG. 4 is a schematic flowchart of a data storage method applied in a storage server in a data cloud storage system, which is provided by embodiments of the present application. The data cloud storage system includes a scheduling management service center, a plurality of storage servers and a plurality of client terminals, wherein the storage servers are communicatively connected with the scheduling management service center, the storage servers are communicatively connected with the client terminals, and the client terminals are communicatively connected with the scheduling management service center.

Specifically, the data storage method can include the following steps.

S301: receiving a resource request containing an identifier of target data, sent by a client terminal.

S302: allocating a storage unit for the target data and generating storage resource information for the target data based on the resource request, wherein the storage resource information contains the identifier of the target data and second address information of the storage unit for storing the target data.

S303: feeding a resource request response back to the client terminal, such that upon receipt of the resource request response, the client terminal sends a data storage request containing the target data to be stored to the storage server corresponding to the first address information.

S304: generating data index information for the target data based on attribute information of the target data.

Specifically, the attribute information of the target data can include a timestamp of the target data, etc., and the attribute information of the target data is not limited herein.

S305: storing the target data in the storage unit corresponding to the second address information based on the storage resource information of the target data.

Wherein, the target data can include: video stream data or video file data.

In a particular implementation of the present application, when the target data are video stream data of a surveillance system, the identifier of the target data is the unique ID of a video encoder that encodes the video stream data;

the generated storage resource information for the target data at least includes the correspondence between the unique ID of the video encoder and the storage unit for storing the video stream data in the storage server corresponding to the first address information;

the generated data index information for the target data at least includes the correspondence between the unique ID of the video encoder and the point in time of a key video frame in the video stream data.

The point in time of the key video frame can include the following two:

(1) Encoding timestamp of the key video frame. Typically, the key video frame in the video stream data carries an encoding timestamp. Therefore, in the case where the encoding timestamp can be obtained when the storage server decodes the video stream data, the timestamp is recorded as the point in time of the key video frame.

(2) Storage time of the key video frame. In the case where the encoding timestamp cannot be obtained when the storage server decodes the video stream data, time at which the key video frame is stored can be determined as the point in time of the key video frame.

It should be noted that those described above are merely particular examples for the point in time of the key video frame. There are no needs to limit the particular ways of determining the point in time of a key video frame in the embodiments of the present application, and any possible implementation can be applied to the present application. Those of ordinary skills in the art need to make reasonable settings according to particular situations in the practical application.

Specifically, storing the target data in the storage unit allocated for the target data based on the storage resource information of the target data, can include the following steps:

(1) obtaining the unique ID of the video encoder corresponding to the video stream data contained in the resource request sent by the client terminal;

(2) determining the storage unit for storing the video stream data based on the correspondence between the unique ID of the video encoder and the storage unit in the storage server corresponding to the first address information;

(3) storing the target data in the determined storage unit in the storage server.

As an embodiment of the present application, the data storage method shown in FIG. 4 can include: sending the storage resource information to the scheduling management service center, such that the scheduling management service center determines the usage status of each of the storage servers based on hardware resource information and the storage resource information reported by each of the storage servers; and if the target data in the received storage server query request have not been stored, allocates a storage server for storing the target data based on the usage status of each of the storage servers and stores the identifier of the target data and node information of the storage server where the target data are located.

It can be seen that the embodiments of the present application can guarantee data storage, data query and data download in the event of a failure of the scheduling management service center. Thus, the sensitivity of the data cloud storage system to the failure of the scheduling management service center is reduced.

Figure 5:
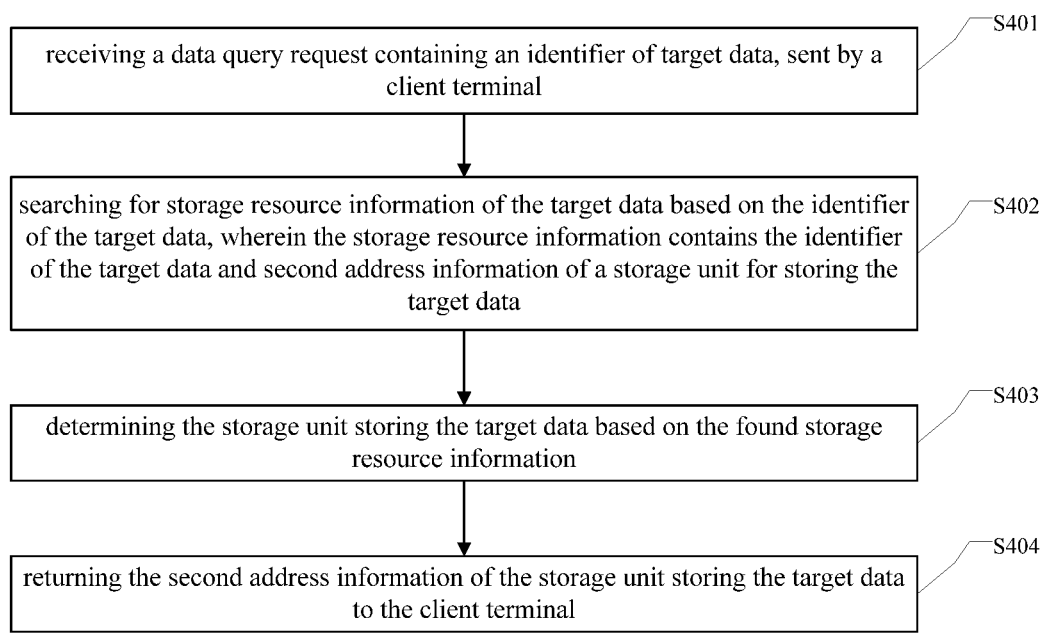
FIG. 5 is a schematic flowchart of a data access method applied in a storage server in a data cloud storage system, which is provided by embodiments of the present application.

FIG. 5 is a schematic flowchart of a data access method applied in a storage server in a data cloud storage system, which is provided by embodiments of the present application. The data cloud storage system includes a scheduling management service center, a plurality of storage servers and a plurality of client terminals, wherein the storage servers are communicatively connected with the scheduling management service center, the storage servers are communicatively connected with the client terminals, and the client terminals are communicatively connected with the scheduling management service center.

Specifically, the data access method can include the following steps.

S401: receiving a data query request containing an identifier of target data, sent by the client terminal.

S402: searching for storage resource information of the target data based on the identifier of the target data, wherein the storage resource information contains the identifier of the target data and second address information of a storage unit for storing the target data.

S403: determining the storage unit storing the target data based on the found storage resource information.

S404: returning the second address information of the storage unit storing the target data to the client terminal.

Wherein, the target data includes: video stream data or video file data.

In a particular implementation of the present application, when the target data are video stream data of a surveillance system, the identifier of the target data is the unique ID of a video encoder that encodes the video stream data;

the found storage resource information at least includes the correspondence between the unique ID of the video encoder and the storage unit for storing the video stream data in the storage server corresponding to the first address information;

specifically, determining the storage unit for storing the target data based on the found storage resource information, can include:

(1) obtaining the unique ID of the video encoder corresponding to the video stream data contained in the data query request sent by the client terminal;

(2) determining a storage unit for storing the video stream data based on the correspondence between the unique ID of the video encoder and the storage unit in the storage server corresponding to the first address information.

It can be seen that the embodiments of the present application can guarantee data storage, data query and data download in the event of a failure of the scheduling management service center. Thus, the sensitivity of the data cloud storage system to the failure of the scheduling management service center is reduced.

Figure 6:
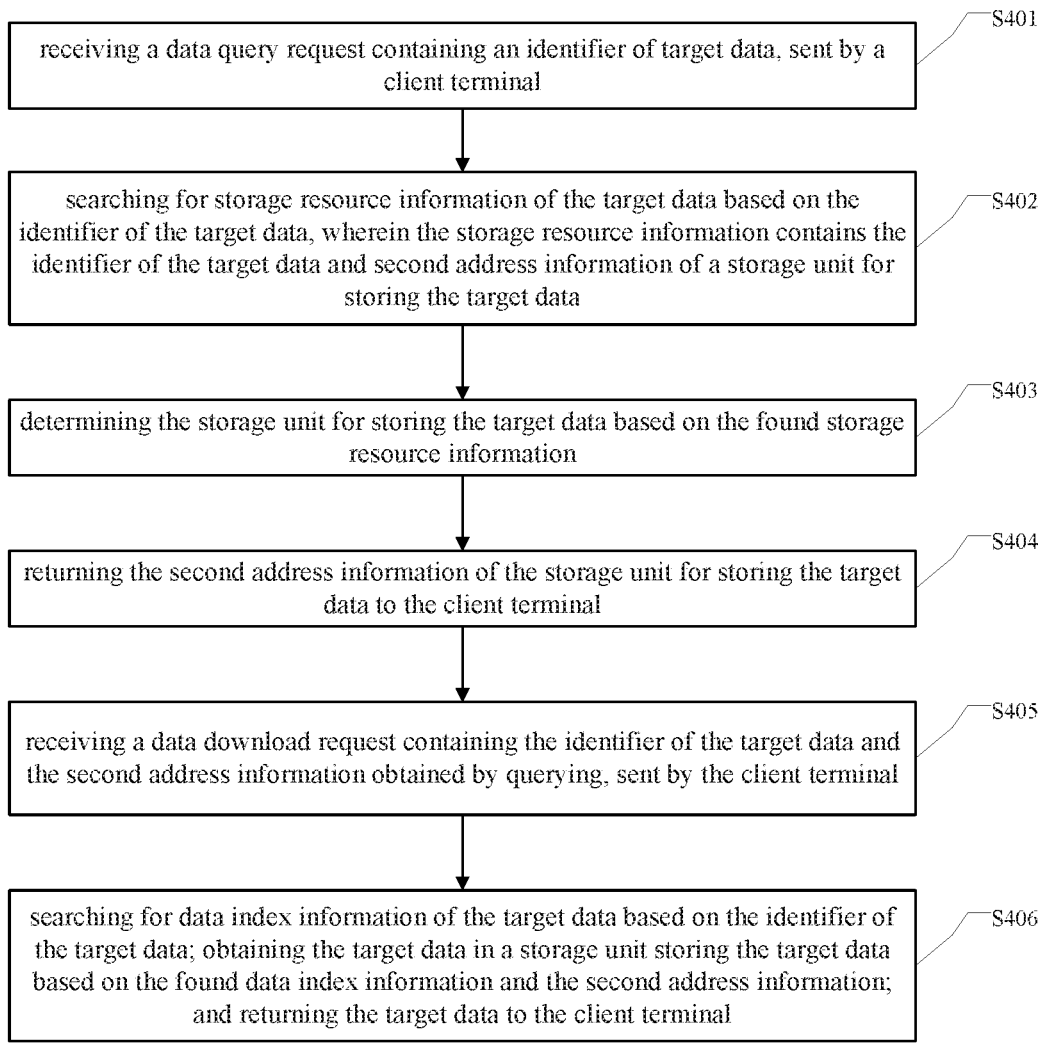
FIG. 6 is a schematic flowchart of another data access method applied in a storage server in a data cloud storage system, which is provided by embodiments of the present application.

FIG. 6 is a schematic flowchart of another data access method applied in a storage server in a data cloud storage system, which is provided by embodiments of the present application. On the basis of the embodiment of the method shown in FIG. 5, the following steps can be further included:

S405: receiving a data download request containing the identifier of the target data and the second address information obtained by query, sent by the client terminal.

S406: searching for data index information of the target data based on the identifier of the target data; obtaining the target data from a storage unit storing the target data based on the found data index information and the second address information; and returning the target data to the client terminal.

Wherein, the target data includes: video stream data or video file data.

In a particular implementation of the present application, when the target data are video stream data of a surveillance system, the identifier of the target data is the unique ID of a video encoder that encodes the video stream data;

the found storage resource information at least includes the correspondence between the unique ID of the video encoder and the storage unit for storing the video stream data in the storage server corresponding to the first address information;

the found data index information at least includes the correspondence between the unique ID of the video encoder and the point in time of a key video frame in the video stream data;

specifically, obtaining the target data from a storage unit storing the target data based on the found data index information and the second address information, and returning the target data to the client terminal, can include:

(1) obtaining the unique ID of the video encoder corresponding to the video stream data contained in the data download request sent by the client terminal;

(2) determining a storage unit for storing the video stream data based on the correspondence between the unique ID of the video encoder and the storage unit in the storage server corresponding to the first address information;

(3) obtaining the time offset of the target data in the determined storage unit based on the correspondence between the unique ID of the video encoder and the point in time of the key video frame in the video stream data, obtaining the target data to be downloaded based on the time offset, and returning the target data to the client terminal.

It can be seen that the embodiments of the present application can guarantee data storage, data query and data download in the event of a failure of the scheduling management service center. Thus, the sensitivity of the data cloud storage system to the failure of the scheduling management service center is reduced.

Figure 7:
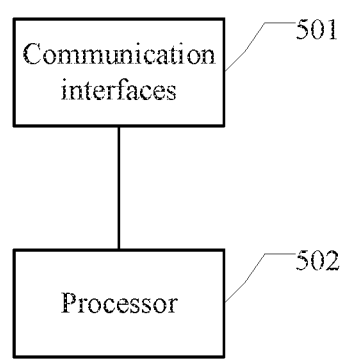
FIG. 7 is a schematic structural diagram of a client terminal applied in a data cloud storage system, which is provided by embodiments of the present application.

FIG. 7 is a schematic structural diagram of a client terminal applied in a data cloud storage system, which is provided by embodiments of the present application. The data cloud storage system includes a scheduling management service center, a plurality of storage servers and a plurality of client terminals, wherein the client terminals are communicatively connected with the scheduling management service center, the client terminals are communicatively connected with the plurality of storage servers, and the scheduling management service center is communicatively connected with the plurality of storage servers.

Specifically, the client terminal can include communication interfaces 501 and a processor 502.

Wherein, the communication interfaces 501 are configured for network communication with the scheduling management service center and each of the storage servers.

The processor 502 is configured for sending a storage server query request containing an identifier of target data to the scheduling management service center; when the scheduling management service center is under normal operation, receiving first address information of a storage server for storing the target data sent by the scheduling management service center, and caching the identifier of the target data and the corresponding first address information; when the scheduling management service center is under abnormal operation, selecting the first address information of the storage server for storing the target data from the cached first address information; sending a resource request to the storage server corresponding to the first address information, such that the storage server generates data index information and storage resource information for the target data based on the resource request and feeds a resource request response back to the client terminal, wherein the storage resource information contains the identifier of the target data and second address information of a storage unit for storing the target data; and upon receipt of the resource request response fed back by the storage server, sending a data storage request containing the target data to be stored to the storage server corresponding to the first address information, such that the storage server stores the target data in the storage unit corresponding to the second address information based on the storage resource information of the target data.

Figure 8:
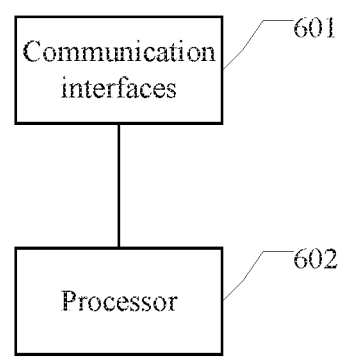
FIG. 8 is a schematic diagram of another client terminal applied in a data cloud storage system, which is provided by embodiments of the present application.

FIG. 8 is a schematic structural diagram of another client terminal applied in a data cloud storage system, which is provided by embodiments of the present application. The data cloud storage system includes a scheduling management service center, a plurality of storage servers and a plurality of client terminals, wherein the client terminals are communicatively connected with the scheduling management service center, the client terminals are communicatively connected with the plurality of storage servers, and the scheduling management service center is communicatively connected with the plurality of storage servers.

Specifically, the client terminal can include communication interfaces 601 and a processor 602.

Wherein, the communication interfaces 601 are configured for network communication with the scheduling management service center and each of the storage servers.

The processor 602 is configured for sending a storage server query request containing an identifier of target data to the scheduling management service center; when the scheduling management service center is under normal operation, receiving first address information of a storage server for storing the target data sent by the scheduling management service center, and caching the identifier of the target data and the corresponding first address information; when the scheduling management service center is under abnormal operation, searching for the cached first address information corresponding to the target data based on the identifier of the target data; and sending a data query request containing the identifier of the target data to the storage server corresponding to the first address information, such that the storage server searches for storage resource information generated during the storage of the target data based on the identifier of the target data, wherein the storage resource information contains the identifier of the target data and second address information of a storage unit for storing the target data, and returning the second address information to the client terminal.

In a particular implementation of the present application, the processor 602 sends a data download request, containing the identifier of the target data and the second address information, to the storage server corresponding to the first address information, such that the storage server searches for data index information generated during the storage of the target data based on the identifier of the target data, obtains the target data from the storage unit storing the target data based on the found data index information and the second address information, and returns the target data to the client terminal.

Figure 9:
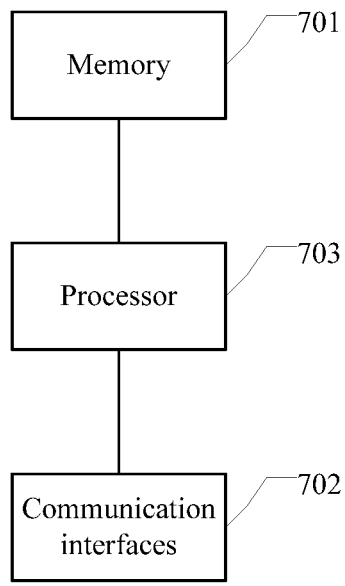
FIG. 9 is a schematic structural diagram of a storage server applied in a data cloud storage system, which is provided by embodiments of the present application.

FIG. 9 is a schematic structural diagram of a storage server applied in a data cloud storage system, which is provided by embodiments of the present application. The data cloud storage system includes a scheduling management service center, a plurality of storage servers and a plurality of client terminals, wherein the storage servers are communicatively connected with the scheduling management service center, the storage servers are communicatively connected with the client terminals, and the client terminals are communicatively connected with the scheduling management service center.

Specifically, the storage server can include: a memory 701, communication interfaces 702 and a processor 703.

The memory 701 includes a plurality of storage units for storing data. the communication interfaces 702 are configured for network communication with each of the client terminals.

The processor 703 is configured for receiving a resource request containing an identifier of target data, sent by a client terminal;

allocating a storage unit for the target data and generating storage resource information for the target data based on the resource request, wherein the storage resource information contains the identifier of the target data and second address information of the storage unit for storing the target data; feeding a resource request response back to the client terminal, such that the client terminal sends a data storage request containing the target data to be stored to the storage server corresponding to first address information; generating data index information for the target data based on attribute information of the target data; and storing the target data in the storage unit corresponding to the second address information based on the storage resource information of the target data.

Figure 10:
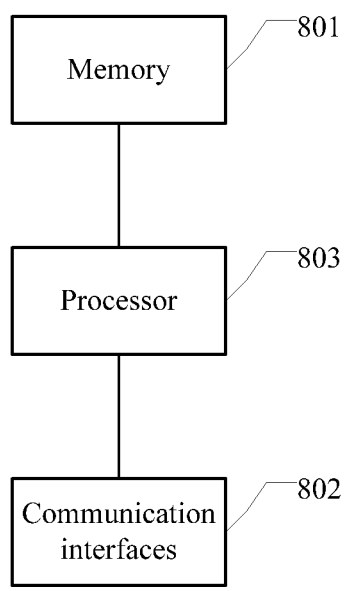
FIG. 10 is a schematic diagram of another storage server applied in a data cloud storage system, which is provided by embodiments of the present application.

FIG. 10 is a schematic diagram of another storage server applied in a data cloud storage system, which is provided by embodiments of the present application. The data cloud storage system includes a scheduling management service center, a plurality of storage servers and a plurality of client terminals, wherein the storage servers are communicatively connected with the scheduling management service center, the storage servers are communicatively connected with the client terminals, and the client terminals are communicatively connected with the scheduling management service center.

Specifically, the storage server can include: a memory 801, communication interfaces 802 and a processor 803.

The memory 801 includes a plurality of storage units for storing data.

The communication interfaces 802 are configured for network communication with each of the client terminals.

The processor 803 is configured for receiving a data query request containing an identifier of target data, sent by a client terminal; searching for storage resource information of the target data based on the identifier of the target data, wherein the storage resource information contains the identifier of the target data and second address information of a storage unit storing the target data; determining the storage unit storing the target data based on the found storage resource information; and returns the second address information of the storage unit for storing the target data to the client terminal.

In a particular implementation of the present application, the communication interfaces 802 are in network communication with the scheduling management service center to report hardware resource information and storage resource information generated by the processor 803 to the scheduling management service center.

In a particular implementation of the present application, the processor 803 receives a data download request containing the identifier of the target data and the second address information obtained by query, sent by the client terminal; searches for data index information of the target data based on the identifier of the target data, obtains the target data from the storage unit storing the target data based on the found data index information and the second address information, and returning the target data to the client terminal.

It can be seen that the embodiments of the present application can guarantee data storage, data query and data download in the event of a failure of the scheduling management service center. Thus, the sensitivity of the data cloud storage system to the failure of the scheduling management service center is reduced.

Figure 11:
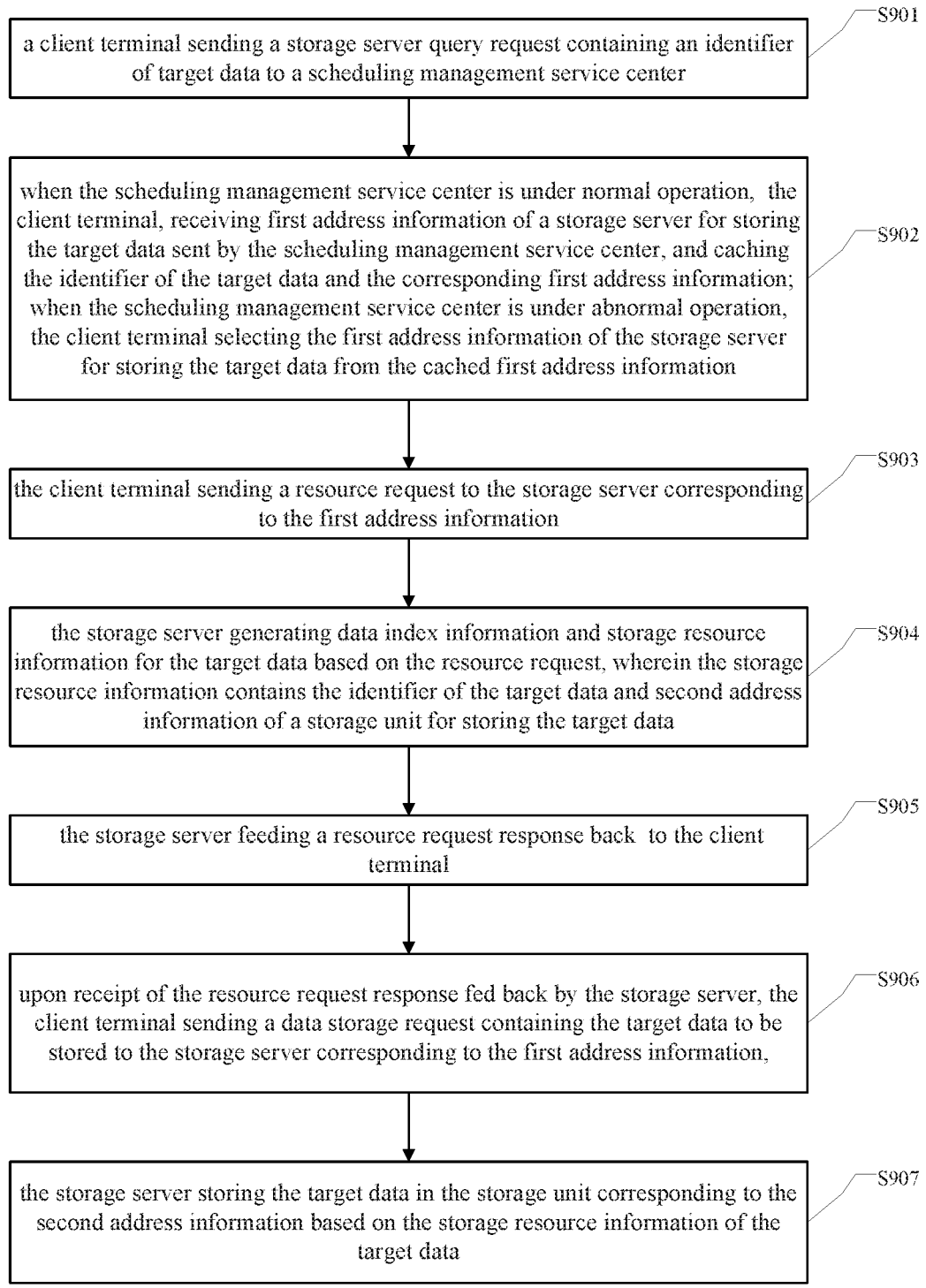
FIG. 11 is a schematic flowchart of a data storage method applied in a data cloud storage system, which is provided by embodiments of the present application.

FIG. 11 is a schematic flowchart of a data storage method applied in a data cloud storage system, which is provided by embodiments of the present application. The data cloud storage system includes a scheduling management service center, a plurality of storage servers and a plurality of client terminals, wherein the client terminals are communicatively connected with the scheduling management service center, the client terminals are communicatively connected with the plurality of storage servers, and the scheduling management service center is communicatively connected with the plurality of storage servers.

Specifically, the data storage method can include the following steps.

S901: a client terminal sending a storage server query request containing an identifier of target data to the scheduling management service center.

S902: when the scheduling management service center is under normal operation, the client terminal, receiving first address information of a storage server for storing the target data sent by the scheduling management service center, and caching the identifier of the target data and the corresponding first address information; when the scheduling management service center is under abnormal operation, the client terminal selecting the first address information of the storage server for storing the target data from the cached first address information.

S903: the client terminal sending a resource request to the storage server corresponding to the first address information.

S904: the storage server generating data index information and storage resource information for the target data based on the resource request, wherein the storage resource information contains the identifier of the target data and second address information of a storage unit for storing the target data.

It should be noted that the second address information mentioned herein can be the physical address of a storage unit in the storage server. The client terminal can generate a query path for target data based on the received second address information, and can output the generated query path to a user for the user to download the data based on the query path.

S905: the storage server feeding a resource request response back to the client terminal.

S906: upon receipt of the resource request response fed back by the storage server, the client terminal sending a data storage request containing the target data to be stored to the storage server corresponding to the first address information.

S907: the storage server storing the target data in the storage unit corresponding to the second address information based on the storage resource information of the target data.

In a particular implementation of the present application, the scheduling management service center determines the usage status of each of the storage servers based on hardware resource information and the storage resource information reported by each of the storage servers; and if the target data in the received storage server query request have not been stored, allocates a storage server for storing the target data based on the usage status of each of the storage servers, and stores the identifier of the target data and node information of the storage server where the target data are located.

It can be seen that the embodiments of the present application can guarantee data storage, data query and data download in the event of a failure of the scheduling management service center. Thus, the sensitivity of the data cloud storage system to the failure of the scheduling management service center is reduced.

Figure 12:
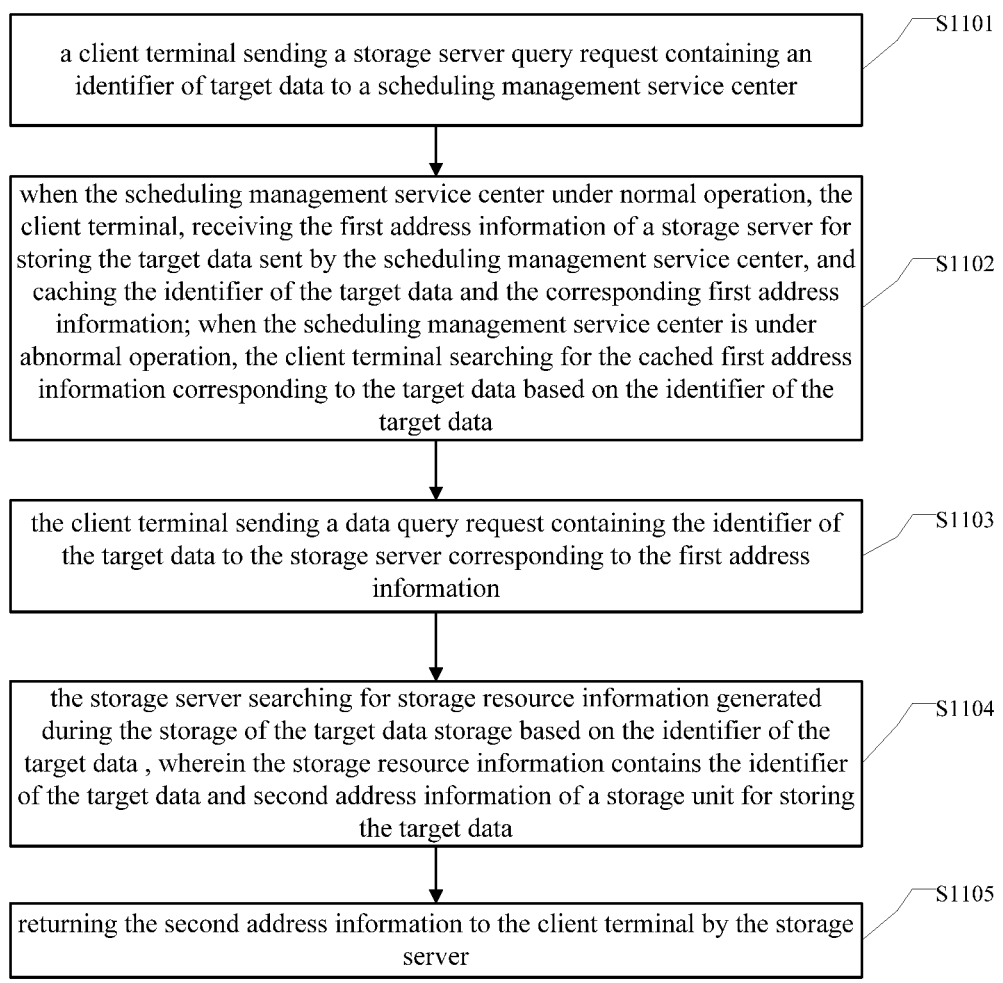
FIG. 12 is a schematic flowchart of a data access method applied in a data cloud storage system, which is provided by embodiments of the present application.

FIG. 12 is a schematic flowchart of a data access method applied in a data cloud storage system, which is provided by embodiments of the present application. The data cloud storage system includes a scheduling management service center, a plurality of storage servers and a plurality of client terminals, wherein the client terminals are communicatively connected with the scheduling management service center, the client terminals are communicatively connected with the plurality of storage servers, and the scheduling management service center is communicatively connected with the plurality of storage servers.

Specifically, the data access method can include the following steps:

S1101: a client terminal sending a storage server query request containing an identifier of target data to the scheduling management service center.

S1102: when the scheduling management service center is under normal operation, the client terminal, receiving first address information of a storage server for storing the target data sent by the scheduling management service center, and caching the identifier of the target data and the corresponding first address information; when the scheduling management service center is under abnormal operation, the client terminal searching for the cached first address information corresponding to the target data based on the identifier of the target data.

S1103: the client terminal sending a data query request containing the identifier of the target data to the storage server corresponding to the first address information.

S1104: the storage server searching for storage resource information generated during the storage of the target data based on the identifier of the target data, wherein the storage resource information contains the identifier of the target data and second address information of a storage unit for storing the target data.

S1105: the storage server returning the second address information to the client terminal.

Figure 13:
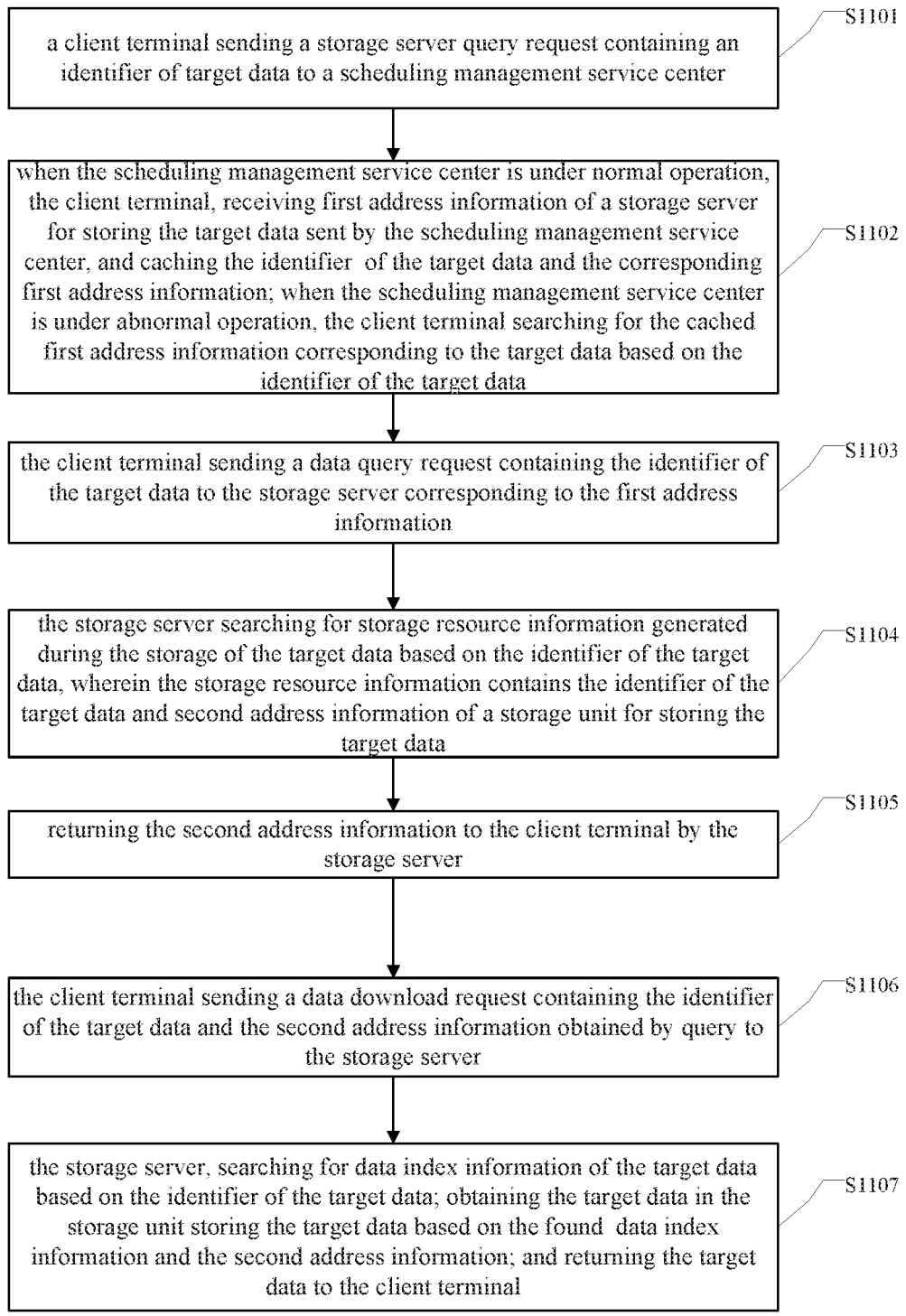
FIG. 13 is a schematic flowchart of another data access method applied in a data cloud storage system, which is provided by embodiments of the present application.

FIG. 13 is a schematic flowchart of another data access method applied in the data cloud storage system, which is provided by embodiments of the present application. On the basis of the embodiment of the method shown in FIG. 12, the following steps can also be included:

S1106: the client terminal sending a data download request, containing the identifier of the target data and the second address information obtained by query, to the storage server.

S1107: the storage server, searching for data index information of the target data based on the identifier of the target data; obtaining the target data from the storage unit storing the target data based on the found data index information and the second address information; and returning the target data to the client terminal.

It can be seen that the embodiments of the present application can guarantee data storage, data query and data download in the event of a failure of the scheduling management service center. Thus, the sensitivity of the data cloud storage system to the failure of the scheduling management service center is reduced.

The data storage, query and download method in the embodiments of the present application will be described in detail below with reference to particular embodiments.

For example, in a video surveillance system, five video encoders EC1, EC2, EC3, EC4 and EC5 for video capturing cameras are provided, and unique IDs (i.e., ID1, ID2, ID3, ID4, ID5) of the video encoders are determined as the identifiers of video stream data processed by various video encoders, respectively.

If a data cloud storage system, for example, includes one scheduling management service center, three storage servers S1, S2, S3 and a client terminal, wherein each of the storage servers includes 10 storage units, and each of the storage units can store a surveillance video with a duration of 10 minutes, respectively denoted as U10 to U19, U20 to U29 and U30 to U39.

Embodiment One: The Data Storage Process

The client terminal sends a storage server query request Q1 containing an identifier ID3 of the video stream data to the scheduling management service center;

the scheduling management service center receives the storage server query request Q1 sent by the client terminal, obtains first address information Index1 of the storage server S1 for storing the target data identified as ID3, based on the identifier of the stored data and node information of the storage server reported by each of the storage servers, and sends Index1 to the client terminal;

the client terminal sends a resource request Q2 containing the identifier of the target data to the storage server corresponding to the first address information, after receiving the first address information Index1 sent by the scheduling management service center;

for example, the target video to be stored is a surveillance video taken from 9:00 am to 10:00 am, the storage server S1 receives the resource request Q2 sent by the client terminal, allocates storage units U11 to U17 for the target data based on the resource request Q2, and generates storage resource information Index11 to Index 17 for the target data;

the storage server S1 feeds a resource request response back to the client terminal;

the client terminal sends a data storage request to the storage server S1 corresponding to the first address information Index1, upon receipt of the resource request response fed back by the storage server S1;

the storage server S1 generates data index information for the target data based on attribute information of the target data, wherein one key video frame recorded in the data index information is taken per second, i.e., every 1 second, a timestamp of one key video frame is recorded per second;

the storage server S1 stores the target data in the storage units U11 to U17 allocated for the target data based on the storage resource information of the target data.

Embodiment Two: The Data Access Process

The client terminal sends a storage server query request Q3 containing an identifier ID3 of the video stream data to the scheduling management service center;

if first address information Index1 returned by the scheduling management service center is not received within a predetermined time period 500 ms, it is determined that the scheduling management service center is under abnormal operation, the client terminal selects the first address information Index1 of the storage server S1 storing the video stream data from the cached first address information in the client terminal;

the client terminal sends a data query request Q4 containing the identifier of the target data to the storage server S1 corresponding to the first address information Index1, based on the obtained first address information;

the storage server S1 searches for the storage resource information, which are Index11 to Index 17, of the video stream data based on the identifier ID3 of the video stream data, and determines that the storage units storing the target data are U11 to U17 based on the found storage resource information;

the storage server S1 returns second address information of the storage unit storing the target data to the client terminal.

Specifically, the client terminal receives a data download request Q5 from the storage server S1; for example, the data download request is: downloading a surveillance video taken from 9:18 am to 9:20 am;

the storage server S1 searches for data index information of the video stream data based on the identifier ID3 of the video stream data, determines that the storage unit storing the target data is U12 based on the second address information, obtains the time offset in the storage unit storing the video stream data based on the timestamp of the key video frame recorded in the found data index information, locates the target data in the storage unit U12 storing the target data, and obtains the target data stored in the storage unit U12;

the storage server returns the obtained target data to the client terminal.

It can be seen that the embodiments of the present application can guarantee data storage, data query and data download in the event of a failure of the scheduling management service center. Thus, the sensitivity of the data cloud storage system to the failure of the scheduling management service center is reduced.

The embodiment of the present application further provides a storage medium, wherein the storage medium is configured to store an executable code that performs, when being executed, the data storage method or the data access method as described in embodiments of the present application.

Wherein, the data storage method described herein is applied in a client terminal in a data cloud storage system including a scheduling management service center, a plurality of storage servers and a plurality of client terminals, wherein the client terminals are communicatively connected with the scheduling management service center, the client terminals are communicatively connected with the plurality of storage servers, and the scheduling management service center is communicatively connected with the plurality of storage servers. The method includes:

sending a storage server query request containing an identifier of target data to the scheduling management service center;

when the scheduling management service center is under normal operation, receiving first address information of a storage server for storing the target data sent by the scheduling management service center, and caching the identifier of the target data and the corresponding first address information; when the scheduling management service center is under abnormal operation, selecting the first address information of the storage server for storing the target data from the cached first address information;

sending a resource request to the storage server corresponding to the first address information, such that the storage server generates data index information and storage resource information for the target data based on the resource request and feeds a resource request response back to the client terminal, wherein the storage resource information contains the identifier of the target data and second address information of a storage unit for storing the target data;

upon receipt of the resource request response fed back by the storage server, sending a data storage request containing the target data to be stored to the storage server corresponding to the first address information, such that the storage server stores the target data in the storage unit corresponding to the second address information based on the storage resource information of the target data.

Wherein, another data storage method described herein is applied in a storage server in a data cloud storage system including a scheduling management service center, a plurality of storage servers and a plurality of client terminals, wherein the storage servers are communicatively connected with the scheduling management service center, the storage servers are communicatively connected with the client terminals, and the client terminals are communicatively connected with the scheduling management service center. The method includes:

receiving a resource request containing an identifier of target data, sent by a client terminal;

allocating a storage unit for the target data and generating storage resource information for the target data based on the resource request, wherein the storage resource information contains the identifier of the target data and second address information of the storage unit for storing the target data;

feeding a resource request response back to the client terminal, such that upon receipt of the resource request response, the client terminal sends a data storage request containing the target data to be stored to the storage server corresponding to the first address information;

generating data index information for the target data based on attribute information of the target data;

storing the target data in the storage unit corresponding to the second address information based on the storage resource information of the target data.

Wherein, another data storage method described herein is applied in a data cloud storage system including a scheduling management service center, a plurality of storage servers and a plurality of client terminals, wherein the client terminals are communicatively connected with the scheduling management service center, the client terminals are communicatively connected with the plurality of storage servers, and the scheduling management service center is communicatively connected with the plurality of storage servers. The method includes:

the client terminal sending a storage server query request containing an identifier of target data to the scheduling management service center;

when the scheduling management service center is under normal operation, the client terminal, receiving first address information of a storage server for storing the target data sent by the scheduling management service center, and caching the identifier of the target data and the corresponding first address information; when the scheduling management service center is under abnormal operation, the client terminal selecting the first address information of the storage server storing the target data from the cached first address information;

the client terminal sending a resource request to the storage server corresponding to the first address information;

the storage server generating data index information and storage resource information for the target data based on the resource request, wherein the storage resource information contains the identifier of the target data and second address information of a storage unit for storing the target data;

the storage server feeding a resource request response back to the client terminal;

upon receipt of the resource request response fed back by the storage server, the client terminal sending a data storage request containing the target data to be stored to the storage server corresponding to the first address information.

the storage server storing the target data in the storage unit corresponding to the second address information based on the storage resource information of the target data.

Wherein, the data access method described herein is applied in a client terminal in a data cloud storage system including a scheduling management service center, a plurality of storage servers and a plurality of client terminals, wherein the client terminals are communicatively connected with the scheduling management service center, the client terminals are communicatively connected with the plurality of storage servers, and the scheduling management service center is communicatively connected with the plurality of storage servers. The method includes:

sending a storage server query request containing an identifier of target data to the scheduling management service center;

when the scheduling management service center is under normal operation, receiving first address information of a storage server for storing the target data sent by the scheduling management service center, and caching the identifier of the target data and the corresponding first address information; when the scheduling management service center is under abnormal operation, searching for the cached first address information corresponding to the target data based on the identifier of the target data;

sending a data query request containing the identifier of the target data to the storage server corresponding to the first address information, such that the storage server searches for storage resource information generated during the storage of the target data based on the identifier of the target data, wherein the storage resource information contains the identifier of the target data and second address information of a storage unit for storing the target data, and returning the second address information to the client terminal.

Wherein, another data access method described herein is applied in a storage server in a data cloud storage system including a scheduling management service center, a plurality of storage servers and a plurality of client terminals, wherein the storage servers are communicatively connected with the scheduling management service center, the storage servers are communicatively connected with the client terminals, and the client terminals are communicatively connected with the scheduling management service center. The method includes:

receiving a data query request containing an identifier of target data, sent by a client terminal;

searching for storage resource information of the target data based on the identifier of the target data, wherein the storage resource information contains the identifier of the target data and second address information of a storage unit storing the target data;

determining the storage unit storing the target data based on the found storage resource information;

returning the second address information of the storage unit storing the target data to the client terminal.

Wherein, another data access method described herein is applied in a data cloud storage system including a scheduling management service center, a plurality of storage servers and a plurality of client terminals, wherein the client terminals are communicatively connected with the scheduling management service center, the client terminals are communicatively connected with the plurality of storage servers, and the scheduling management service center is communicatively connected with the plurality of storage servers. The method includes:

the client terminal sending a storage server query request containing an identifier of target data to the scheduling management service center;

when the scheduling management service center is under normal operation, the client terminal, receiving first address information of a storage server for storing the target data sent by the scheduling management service center, and caching the identifier of the target data and the corresponding first address information; when the scheduling management service center is under abnormal operation, the client terminal searching for the cached first address information corresponding to the target data based on the identifier of the target data;

the client terminal sending a data query request containing the identifier of the target data to the storage server corresponding to the first address information;

the storage server searching for storage resource information generated during the storage of the target data based on the identifier of the target data, wherein the storage resource information contains the identifier of the target data and second address information of a storage unit for storing the target data;

the storage server returning the second address information to the client terminal.

As described above, the storage medium provided in the embodiments of the present application is configured for storing an application program. The stored application program, when being executed, can guarantee data storage, data query and data download in the event of a failure of the scheduling management service center. Thus, the sensitivity of the data cloud storage system to the failure of the scheduling management service center is reduced.

The embodiment of the present application further provides an application program for executing the data storage method or the data access method described in the embodiments of the present application when being executed.

It should be noted that, for the data storage method or the data access method described in the embodiments of the present application that are performed by the application program, reference is made to the description of the storage media, and no repeated description will be made herein.

As can be known from above, it is possible to guarantee that data storage, data query and data download can be continued when a failure occurs in the scheduling management service center, by executing the application program provided by the embodiments of the present application. Thus, the sensitivity of the data cloud storage system to the failure of the scheduling management service center is reduced.

It should be noted that the relationship terms herein such as "first", "second" and the like, if any, are only configured for distinguishing one entity or operation from another entity or operation, but do not necessarily require or imply that there is actual relationship or order between these entities or operations. Moreover, the terms "include", "comprise" or any other variants thereof are intended to cover a non-exclusive inclusion, so that processes, methods, articles, or devices comprising a series of elements comprise not only those elements listed but also those not specifically listed or the elements intrinsic to these processes, methods, articles, or equipment. Without further limitations, elements defined by the sentences "comprise(s) a . . . " or "include(s) a . . . " do not exclude that there are other identical elements in the processes, methods, articles, or devices which include these elements.

It will be understood by those of ordinary skills in the art that all or some of the steps in the methods described above may be accomplished by a program instructing the associated hardware. Said program may be stored in a computer-readable storage medium, such as ROMs/RAMs, magnetic disks, optical disks, etc.

What have been described above are merely specific embodiments of the present application, and are not configured to limit the present application. Any modification, equivalent replacement or improvement made within the spirit and principle of the present application falls within the protection scope of the present application.

The invention claimed is:

1. A data storage method, wherein it is applied in a client terminal in a data cloud storage system comprising a scheduling management service center, a plurality of storage servers and a plurality of client terminals, wherein the client terminals are communicatively connected with the scheduling management service center, the client terminals are communicatively connected with the plurality of storage servers, and the scheduling management service center is communicatively connected with the plurality of storage servers, the method comprising:

sending a storage server query request containing an identifier of target data to the scheduling management service center;

when the scheduling management service center is under normal operation, receiving first address information of a storage server for storing the target data sent by the scheduling management service center, and caching the identifier of the target data and the corresponding first address information; when the scheduling management service center is under abnormal operation, selecting the first address information of the storage server for storing the target data from the cached first address information;

sending a resource request to the storage server corresponding to the first address information, such that the storage server generates data index information and storage resource information for the target data based on the resource request and feeds a resource request response back to the client terminal, wherein the storage resource information contains the identifier of the target data and second address information of a storage unit for storing the target data;

upon receipt of the resource request response fed back by the storage server, sending a data storage request containing the target data to be stored to the storage server corresponding to the first address information, such that the storage server stores the target data in the storage unit corresponding to the second address information based on the storage resource information of the target data.

2. The data storage method of claim 1, wherein
when receiving failure information of the scheduling management service center sent by the scheduling management service center after sending the storage server query request containing the identifier of the target data to the scheduling management service center, or when detecting an abnormality in the network connection with the scheduling management service center, determining that the scheduling management service center is under abnormal operation.

3. A data access method, wherein it is applied in a client terminal in a data cloud storage system comprising a scheduling management service center, a plurality of storage servers and a plurality of client terminals, wherein the client terminals are communicatively connected with the scheduling management service center, the client terminals are communicatively connected with the plurality of storage servers, and the scheduling management service center is communicatively connected with the plurality of storage servers, the method comprising:
sending a storage server query request containing an identifier of target data to the scheduling management service center;
when the scheduling management service center is under normal operation, receiving first address information of a storage server for storing the target data sent by the scheduling management service center, and caching the identifier of the target data and the corresponding first address information; when the scheduling management service center is under abnormal operation, searching for the cached first address information corresponding to the target data based on the identifier of the target data;
sending a data query request containing the identifier of the target data to the storage server corresponding to the first address information, such that the storage server searches for storage resource information generated during the storage of the target data based on the identifier of the target data, wherein the storage resource information contains the identifier of the target data and second address information of a storage unit for storing the target data, and returning the second address information to the client terminal.

4. The method of claim 3, wherein it further comprises:
sending a data download request, containing the identifier of the target data and the second address information, to the storage server corresponding to the first address information, such that the storage server searches for data index information generated during the storage of the target data based on the identifier of the target data;
obtaining the target data from the storage unit storing the target data based on the found data index information and the second address information, and returning the target data to the client terminal.

5. A data storage method, wherein it is applied in a storage server in a data cloud storage system comprising a scheduling management service center, a plurality of storage servers and a plurality of client terminals, wherein the storage servers are communicatively connected with the scheduling management service center, the storage servers are communicatively connected with the client terminals, and the client terminals are communicatively connected with the scheduling management service center, the method comprising:
receiving a resource request containing an identifier of target data, sent by a client terminal;
allocating a storage unit for the target data and generating storage resource information for the target data based on the resource request, wherein the storage resource information contains the identifier of the target data and second address information of the storage unit for storing the target data;
feeding a resource request response back to the client terminal, such that upon receipt of the resource request response, the client terminal sends a data storage request containing the target data to be stored to the storage server corresponding to first address information;
generating data index information for the target data based on attribute information of the target data;
storing the target data in the storage unit corresponding to the second address information based on the storage resource information of the target data.

6. The method of claim 5, wherein the target data comprise video stream data or video file data, wherein when the target data are video stream data of a surveillance system, the identifier of the target data is the unique ID of a video encoder that encodes the video stream data;
the generated storage resource information for the target data at least comprises the correspondence between the unique ID of the video encoder and the storage unit for storing the video stream data in the storage server corresponding to the first address information;
the generated data index information for the target data at least comprises the correspondence between the unique ID of the video encoder and the point in time of a key video frame in the video stream data;
storing the target data in the storage unit allocated for the target data based on the storage resource information of the target data, comprises: obtaining the unique ID of the video encoder corresponding to the video stream data contained in the resource request sent by the client terminal; determining the storage unit for storing the video stream data based on the correspondence between the unique ID of the video encoder and the storage unit in the storage server corresponding to the first address information; storing the target data in the determined storage unit in the storage server.

7. The method of claim 5, wherein the method comprises: sending the storage resource information to the scheduling management service center, such that the scheduling management service center determines the usage status of each of the storage servers based on hardware resource information and the storage resource information reported by each of the storage servers, and if the target data in the received storage server query request have not been stored, allocates a storage server for storing the target data based on the usage status of each of the storage servers and stores the identifier of the target data and node information of the storage server where the target data are located.

8. A data access method, wherein it is applied in a storage server in a data cloud storage system comprising a scheduling management service center, a plurality of storage servers and a plurality of client terminals, wherein the storage servers are communicatively connected with the scheduling management service center, the storage servers are communicatively connected with the client terminals, and the client terminals are communicatively connected with the scheduling management service center,
the method comprising:
receiving a data query request containing an identifier of target data sent by a client terminal;

searching for storage resource information of the target data based on the identifier of the target data, wherein the storage resource information contains the identifier of the target data and second address information of a storage unit for storing the target data;

determining the storage unit storing the target data based on the found storage resource information;

returning the second address information of the storage unit storing the target data to the client terminal;

wherein the target data comprise video stream data or video file data, wherein when the target data are video stream data of a surveillance system, the identifier of the target data is the unique ID of a video encoder that encodes the video stream data;

the found storage resource information at least comprises the correspondence between the unique ID of the video encoder and the storage unit for storing the video stream data in the storage server corresponding to the first address information;

determining the storage unit storing the target data based on the found storage resource information, comprises: obtaining the unique ID of the video encoder corresponding to the video stream data contained in the data query request sent by the client terminal; determining a storage unit for storing the video stream data based on the correspondence between the unique ID of the video encoder and the storage unit in the storage server corresponding to the first address information.

9. The method of claim 8, wherein it further comprises:
receiving a data download request containing the identifier of the target data and the second address information obtained by query, sent by the client terminal;

searching for data index information of the target data based on the identifier of the target data; obtaining the target data from the storage unit storing the target data based on the found data index information and the second address information; and returning the target data to the client terminal.

10. The method of claim 9, wherein when the target data are video stream data of a surveillance system, the identifier of the target data is the unique ID of a video encoder that encodes the video stream data;

the found storage resource information at least comprises the correspondence between the unique ID of the video encoder and the storage unit for storing the video stream data in the storage server corresponding to the first address information;

the found data index information at least comprises the correspondence between the unique ID of the video encoder and the point in time of a key video frame in the video stream data;

obtaining the target data from the storage unit storing the target data based on the found data index information and the second address information, and returning the target data to the client terminal, comprises: obtaining the unique ID of the video encoder corresponding to the video stream data contained in the data download request sent by the client terminal; determining a storage unit for storing the video stream data based on the correspondence between the unique ID of the video encoder and the storage unit in the storage server corresponding to the first address information; obtaining the time offset of the target data in the determined storage unit based on the correspondence between the unique ID of the video encoder and the point in time of the key video frame in the video stream data, obtaining the target data to be downloaded based on the time offset, and returning the target data to the client terminal.

11. A client terminal, wherein it is applied in a data cloud storage system comprising a scheduling management service center, a plurality of storage servers and a plurality of client terminals, wherein the client terminals are communicatively connected with the scheduling management service center, the client terminals are communicatively connected with the plurality of storage servers, and the scheduling management service center is communicatively connected with the plurality of storage servers, the client terminal comprising:

communication interfaces, which are configured for network communication with the scheduling management service center and each of the storage servers;

a processor, which is configured for performing the data storage method of claim 1.

12. A client terminal, wherein it is applied in a data cloud storage system comprising a scheduling management service center, a plurality of storage servers and a plurality of client terminals, wherein the client terminals are communicatively connected with the scheduling management service center, the client terminals are communicatively connected with the plurality of storage servers, and the scheduling management service center is communicatively connected with the plurality of storage servers, the client terminal comprising:

communication interfaces, which are configured for network communication with the scheduling management service center and each of the storage servers;

a processor, which is configured for performing the data access method of claim 3.

13. The client terminal of claim 12, wherein
the processor sends a data download request, containing the identifier of the target data and the second address information, to the storage server corresponding to the first address information, such that the storage server searches for data index information generated during the storage of the target data based on the identifier of the target data, obtains the target data from the storage unit storing the target data based on the found data index information and the second address information, and returns the target data to the client terminal.

14. A storage server, wherein it is applied in a data cloud storage system comprising a scheduling management service center, a plurality of storage servers and a plurality of client terminals, wherein the storage servers are communicatively connected with the scheduling management service center, the storage servers are communicatively connected with the client terminals, and the client terminals are communicatively connected with the scheduling management service center, the storage server comprising:

a memory comprising a plurality of storage units for storing data;

communication interfaces, which are configured for network communication with each of the client terminals;

a processor, which is configured for performing the data storage method of claim 5.

15. A storage server, wherein it is applied in a data cloud storage system comprising a scheduling management service center, a plurality of storage servers and a plurality of client terminals, wherein the storage servers are communicatively connected with the scheduling management service center, the storage servers are communicatively connected with the client terminals, and the client terminals are communicatively connected with the scheduling management service center, the storage server comprising:
- a memory comprising a plurality of storage units for storing data;
- communication interfaces, which are configured for network communication with each of the client terminals;
- a processor, which is configured for performing the data access method of claim 8.

16. A data storage method, wherein it is applied in a data cloud storage system comprising a scheduling management service center, a plurality of storage servers and a plurality of client terminals, wherein the client terminals are communicatively connected with the scheduling management service center, the client terminals are communicatively connected with the plurality of storage servers, and the scheduling management service center is communicatively connected with the plurality of storage servers, the method comprising:
- a client terminal sending a storage server query request containing an identifier of target data to the scheduling management service center;
- when the scheduling management service center is under normal operation, the client terminal, receiving first address information of a storage server for storing the target data sent by the scheduling management service center, and caching the identifier of the target data and the corresponding first address information; when the scheduling management service center is under abnormal operation, the client terminal selecting the first address information of the storage server for storing the target data from the cached first address information;
- the client terminal sending a resource request to the storage server corresponding to the first address information;
- the storage server generating data index information and storage resource information for the target data based on the resource request, wherein the storage resource information contains the identifier of the target data and second address information of a storage unit for storing the target data;
- the storage server feeding a resource request response back to the client terminal;
- upon receipt of the resource request response fed back by the storage server, the client terminal sending a data storage request containing the target data to be stored to the storage server corresponding to the first address information;
- the storage server storing the target data in the storage unit corresponding to the second address information based on the storage resource information of the target data.

17. A data access method, wherein it is applied in a data cloud storage system comprising a scheduling management service center, a plurality of storage servers and a plurality of client terminals, wherein the client terminals are communicatively connected with the scheduling management service center, the client terminals are communicatively connected with the plurality of storage servers, and the scheduling management service center is communicatively connected with the plurality of storage servers, the method comprising:
- a client terminal sending a storage server query request containing an identifier of target data to the scheduling management service center;
- when the scheduling management service center is under normal operation, the client terminal, receiving first address information of a storage server for storing the target data sent by the scheduling management service center, and caching the identifier of the target data and the corresponding first address information; when the scheduling management service center is under abnormal operation, the client terminal searching for the cached first address information corresponding to the target data based on the identifier of the target data;
- the client terminal sending a data query request containing the identifier of the target data to the storage server corresponding to the first address information;
- the storage server searching for storage resource information generated during the storage of the target data based on the identifier of the target data, wherein the storage resource information contains the identifier of the target data and second address information of a storage unit for storing the target data;
- the storage server returning the second address information to the client terminal.

18. A data cloud storage system, comprising a scheduling management service center, a plurality of storage servers and a plurality of client terminals, wherein the client terminals are communicatively connected with the scheduling management service center, the client terminals are communicatively connected with the plurality of storage servers, and the scheduling management service center is communicatively connected with the plurality of storage servers, wherein the is configured for performing the data storage method of claim 16.

19. A data cloud storage system, comprising a scheduling management service center, a plurality of storage servers and a plurality of client terminals, wherein the client terminals are communicatively connected with the scheduling management service center, the client terminals are communicatively connected with the plurality of storage servers, and the scheduling management service center is communicatively connected with the plurality of storage servers, wherein the is configured for performing the data access method of claim 17.

* * * * *